Dec. 12, 1961   L. M. HOLLINGSWORTH, JR., ET AL   3,013,199
REGULATED RECTIFYING APPARATUS
Filed May 28, 1958   2 Sheets-Sheet 1

INVENTORS
Lawrence M. Hollingsworth, Jr.
Fred W. Kelley, Jr.
BY Robert F. Recks
Their Attorney Dec. 12, 1961  L. M. HOLLINGSWORTH, JR., ET AL  3,013,199
REGULATED RECTIFYING APPARATUS
Filed May 28, 1958  2 Sheets-Sheet 2

INVENTORS
Lawrence M. Hollingsworth, Jr.
Fred W. Kelley, Jr.
BY Robert J. Peck
Their Attorney United States Patent Office 3,013,199
Patented Dec. 12, 1961

3,013,199
REGULATED RECTIFYING APPARATUS
Lawrence M. Hollingsworth, Jr., and Fred W. Kelley, Jr., Lynchburg, Va., assignors to General Electric Company, a corporation of New York
Filed May 28, 1958, Ser. No. 738,420
9 Claims. (Cl. 321—19)

This invention relates generally to improvements in regulated rectifying apparatus and, in particular, to an improved control circuit therefor which regulates in accordance with output voltage for all values of load current up to a predetermined value and then automatically changes over to regulate in accordance with load current so as to limit load current to a predetermined increase over said predetermined value.

In the past, various attempts have been made to obtain the aforementioned type of regulation, but, in general, such attempts have been characterized by "soft" action at the point of changeover. For example, in the case of regulated rectifying equipment intended for battery charging applications, a typical requirement for such rectifying equipment might be an output voltage of 50 volts throughout a current range of 0–200 amperes with a permissible deviation in output voltage of only one percent over the entire range. Additionally, it is desirable in such equipment to have a current limit that is as close to 200 amperes as possible while still retaining the precise control of voltage up to the current limit point. With prior regulated rectifying equipment it has often been found necessary to extend the current limit to as much as 250 amperes so that the straight line voltage control extends through the 200 ampere point. This results from the "soft" action at the point of changeover, during which a perceptible voltage dip occurs over a rather wide range in current. This, of course, means that the point of changeover must be extended beyond the desired point to get the required regulated output voltage, and such extension means that the rectifying equipment must be rated to carry a much higher load than is necessary. In the example given, the entire rectifying equipment would have to be rated at 250 amperes to insure proper operation, which obviously materially adds to the cost of the equipment.

If the output voltage of such equipment could be precisely controlled up to 200 amperes and the changeover to current limiting control occurred sharply just beyond 200 amperes, such that the maximum current required to accomplish changeover with straight line voltage control up to 200 volts would be 210 amperes, instead of 250 amperes, the savings in such equipment is obvious. Rough calculations indicate that a system with a current limit of 250 amperes would have to be able to handle 42 percent more power than a system which had a current limit of 210 amperes.

Accordingly, it is a primary object of the invention to provide an improved control circuit for regulated rectifying apparatus by which output voltage may be controlled within close limits up to a predetermined value of load current and in which load current will be limited to a minimum increase above the predetermined value.

It is another object of the invention to provide a simplified control circuit for regulated rectifying apparatus which automatically limits the load current of such apparatus to a minimum value above a range in load current over which the output voltage of the apparatus is controlled within close limits.

Briefly, the invention in one of its forms comprises a control circuit for a regulating device of a power amplistat. The regulating device may be in the form of a control amplistat whose output is used to regulate the power amplistat, with the control winding of the control amplistat forming a part of the control circuit. A reference unidirectional current flows through this control winding, and a feedback unidirectional current proportional to output voltage flows through the winding in opposition to the reference current. A second feedback current proportional to load current also flows through the control winding in opposition to the reference current, and the circuits from which the two feedback currents are derived are arranged so that the sum of the two feedback currents is proportional to output voltage up to a predetermined value of load current. At the predetermined value of load current, the feedback current proportional to output voltage is blocked, and the regulating effect is solely in accord with load current and continues under such control with a further drop in load impedance until such time as the output voltage of the power amplistat is reduced to zero.

The objects of the invention together with its benefits and advantages will be more readily understood upon reference to the detailed description which follows, particularly when taken in conjunction with the two sheets of drawings annexed hereto, in which.

Figure 1:
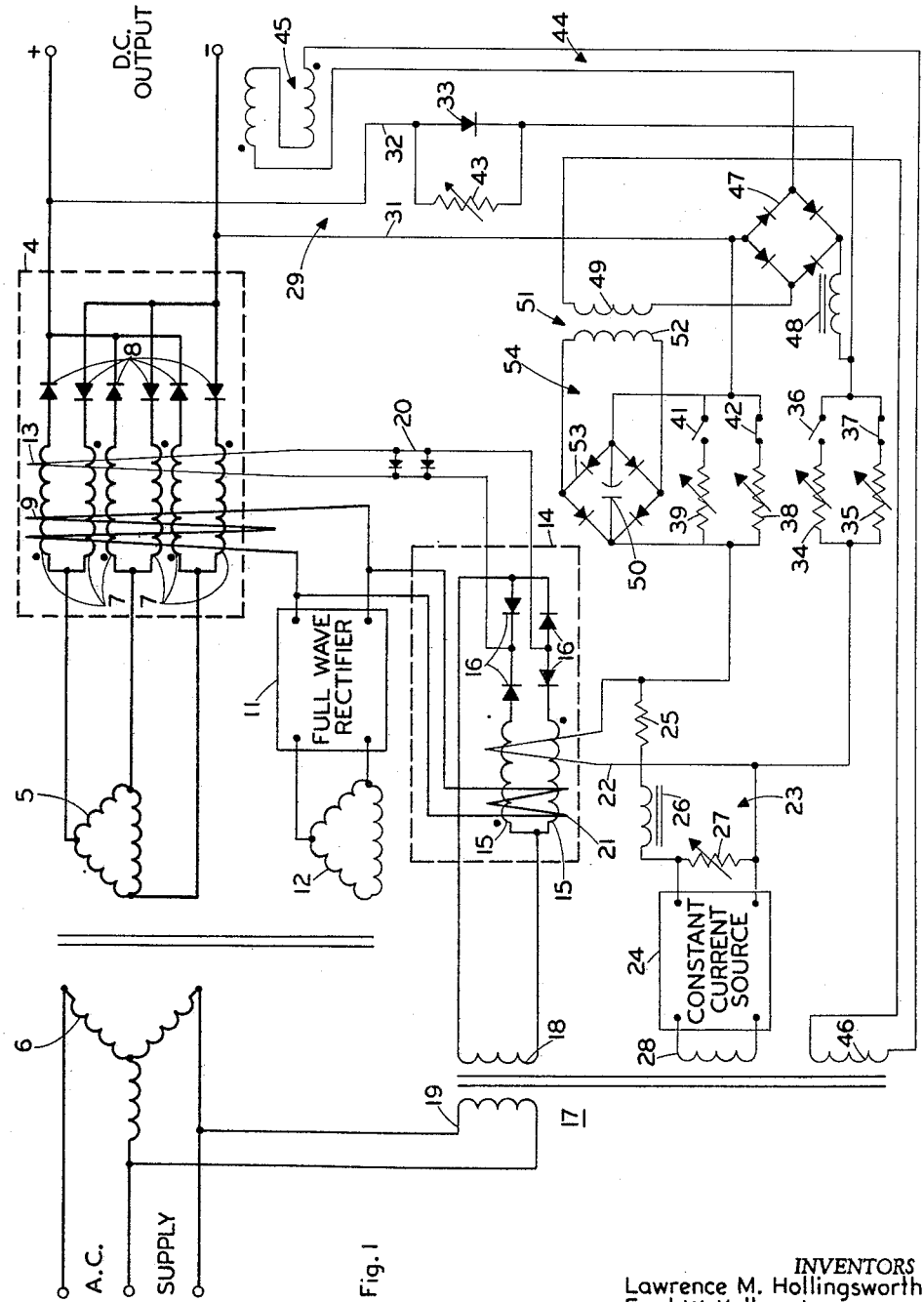
FIG. 1 is a schematic view of a power amplistat and its associated regulating circuitry in which is embodied the subject invention.

Referring now to FIG. 1, there is shown a controllable power rectifier arrangement in the form of a power amplifier 4 which in the illustrated embodiment of the invention is arranged for full-wave rectification of a three-phase alternating current supply for the purpose of delivering a direct current to a direct current load. The A.-C. supply may be delivered to the amplistat from the delta connected secondary 5 of a power transformer which has a Y-connected primary 6. Suitable circuit breakers and the like may be incorporated in advance of the primary of the transformer.

Power amplistat 4 may be of conventional design which includes the saturating windings 7 and the selenium power rectifiers 8 conventionally arranged as shown to provide full-wave rectification of the alternating current supply. A conventional bias winding 9 is also shown as being a part of the power amplistat 4, this bias winding receiving its bias current from the output of a full-wave rectifier 11, which in turn is energized from a delta connected secondary 12, also arranged on the main power transformer. A control winding 13 forms a part of the power amplistat, and it functions in a conventional manner to regulate the output of the power amplistat; that is, the current in the control winding 13 is varied in the proper sense in accordance with the output characteristics of the power amplistat to regulate in the known manner.

The current in control winding 13 is varied for control purposes by the control amplistat 14, which, in the circuit shown, is a conventional full-wave rectifier type arranged to convert single-phase alternating current supply into a direct current output. As with the power amplistat 4, control amplistat 14 has conventional saturating windings 15 together with rectifiers 16. Power for control amplistat 14 is derived from a control transformer 17, which has a secondary winding 18 connected to the control amplistat and its primary winding 19 connected across one phase of the three-phase A.-C. supply lines. The control amplistat 14 has a conventional biasing winding 21 which derives its biasing current from the full-wave rectifier 11. Also forming a part of control amplistat 14 is control winding 22, in which there is caused a current to flow which regulates the output current of control amplistat 14 so that in turn, through the connection with power amplistat 4, the latter amplistat may be suitably regulated.

Figure 3:
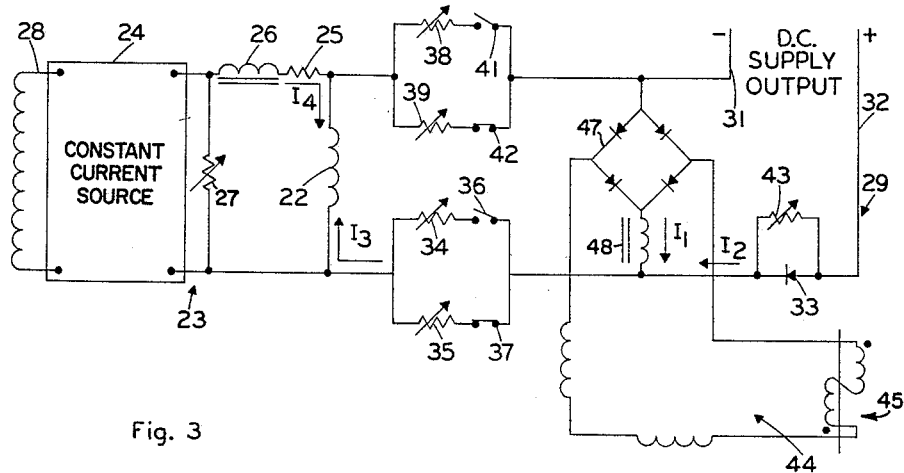
FIG. 3 is a slightly rearranged showing of the portion of the circuit of FIG. 1 which forms the subject invention.

To regulate the current in control winding 22 there is provided a novel control circuit which is shown in both FIGS. 1 and 3 and which includes a reference circuit 23 which has a device 24 which functions to develop a constant unidirectional current for control purposes. The constant current output from device 24 flows through the control winding 22, which has in series with it a resistor 25 and an inductor 26, there being an adjustable resistor 27 across this series combination for the purpose of precisely adjusting the magnitude of the reference current which flows through the control winding. The arrow $I_4$ in FIG. 3 denotes the direction of the reference current through the control winding.

The constant current source 24 is energized from the control transformer 17 by means of the secondary winding 28, and its operation will be described further on in the specification. Suffice to say that it is a form of reactor which includes a permanent magnet such that a closely controlled output current is produced. Any type of constant current source can be used to produce the reference current, the particular one used in this circuit being selected because of its excellent performance at low reference power levels.

In operation, the resistor 25 functions as a loading resistor for the constant current source 24, and the resistor 27 is adjustable to select the precise value of constant current which flows. Inductor 26 functions to block any ripple current which might flow from the constant current device 24. The reference circuit is arranged so that under normal conditions the reference current will always be greater than any currents which oppose it in the control winding 22.

The control winding 22, in addition to forming a part of reference circuit 23, also forms a part of a first feedback circuit 29, which comprises the connections 31, 32 arranged across the output of the power amplistat 4 and includes the germanium diode 33, the paralleled resistors 34, 35 and their associated switches 36, 37, respectively, the control winding 22, and the paralleled resistors 38, 39 with their associated switches 41, 42, respectively. The diode 33 has an adjustable resistor 43 connected thereacross, and this diode is arranged in series relationship with the two sets of paralleled resistors and the control winding 22. Since this first feedback circuit is connected across the output of power amplistat 4, it is apparent that the output voltage of the power amplistat will cause a current to flow through the feedback circuit 29, and the arrow $I_2$ in FIG. 3 shows the direction of this current through control winding 22. The feedback current derived from the output voltage is in a direction opposite to the reference current, and considering only these currents, a net current will flow though the control winding 22 which has a magnitude proportional to the output voltage.

Forgetting for a moment the effect of the paralleled resistors 38, 39 and with the switch 37 closed and with no load on the power amplistat 4, and assuming rated input voltage applied to the power amplistat, the feedback current $I_2$ flowing in feedback circuit 29 will be at a maximum, which means that the net current through the control winding will be at a minimum, which in turn will cause the otput of the control amplistat to be at a minimum, thereby producing minimum current in the control winding of the power amplistat. The current in the bias windings in each of the amplistats is related to these minimum currents in their respective control windings to govern the proper firing of the amplistats.

Should there be a decrease in the output voltage of the power amplistat, the feedback current $I_2$ in circuit 29 would be reduced, causing the net current in control winding 22 to increase. This will have the effect of increasing the output of the control amplistat and hence increasing the output of the power amplistat to bring the output voltage up to its rated value. On the other hand, should the output voltage of the power amplistat increase, which could happen if the alternating current supply voltage increases, the feedback current in feedback circuit 29 will increase to decrease the net current in control winding 22, which in turn will cause the output of the control amplistat to decrease. Upon this happening, the current in the control winding of the power amplistat will decrease and its output voltage will decrease to the rated value.

In order to limit the load current of the power amplistat 4, a second feedback circuit 44 is provided comprising the load current responsive reactor 45, the secondary 46, the full-wave bridge rectifier 47, and inductor 48. The secondary 46 supplies alternating current to feedback circuit 44 from control transformer 17.

The operation of this feedback circuit is basically the same as that disclosed in FIG. 16 of U.S. Patent No. 2,153,378, issued April 4, 1939, and it will be seen upon reference to this Kramer patent that a direct current $I_1$ will flow in feedback circuit 44 which is proportional to the load current in the output circuit of the power amplistat. Since bridge rectifier 47 is connected into feedback circuit 29, this direct current will flow into feedback circuit 29 and inductor 48 will block any ripple current that might tend to flow.

Reactor 45 is a commerically available product of the assignee of the present application, and since its operation is fully described in the aforesaid Kramer patent, it is not necessary in this application to describe in detail how this reactor functions to derive a direct current proportional to the load current of the power amplistat, but it is only necessary to understand that this is the action that takes place. Also, it is to be noted that the constant current source 24 is simply a modified form of reactor 45, in that in place of the saturating effect produced by the load current a permanent magnet is used which gives a constant saturating effect, to thereby produce a constant output current.

Also forming a part of feedback circuit 44 is the primary winding 49 of an isolation current transformer 51, which has its secondary 52 connected across opposite junctions of a full-wave bridge rectifier 53, which in turn has its other junctions connected across the filtering condenser 50 and the paralleled resistors 38, 39. The isolation transformer and the rectifier bridge and resistors associated therewith form a voltage compounding circuit 54, which will be described in more detail later on in the specification.

Forgetting for a moment the voltage compounding circuit, it will be understood that a direct current will flow from feedback circuit 44 into feedback circuit 29 in series with the feedback current flowing in that circuit, making the total current in the control winding 22 which opposes the reference current the sum of both feedback currents. For convenience the various currents flowing in the control circuit are designated as follows:

$I_1$ is the direct current which flows in the feedback circuit 44 and is proportional to the value of load current being supplied by power amplistat 4;

$I_2$ is the current which flows in feedback circuit 29 and it is related to the output voltage of the power amplistat 4;

$I_3$ is the sum of $I_1$ and $I_2$, and it flows in a first direction across control winding 22; and $I_4$ is the reference current derived from the constant control source 24, and it flows in control winding 22 in opposition to $I_3$.

From the above, it will be seen that the net current in the control winding 22 will be $I_4$ minus $I_3$. $I_3$ will be supplied from the two feedback circuits 29, 44 at load currents below the limit value and from feedback circuit 44 alone at load currents above the limit value. The diode 33 controls the switch over point and its action is quite "sharp," thus avoiding the undesirable "soft" action which has characterized prior current limiting schemes.

In operation, the feedback circuit 44 develops a reverse voltage on diode 33, which is derived from the product of the feedback current $I_1$ times the resistance of the circuit through which this current flows. Below the current limit point, this reverse voltage is always less than the forward voltage across the diode—which is the output voltage of the power amplistat 4—and since feedback circuit 44 is a current source, the diode 33 will pass sufficient current $I_2$ to make the product of $I_3$ (the sum of $I_1$ and $I_2$) times the circuit resistance equal to the output voltage of amplistat 4. In this way, $I_3$ will be proportional to output voltage and the regulation of amplistat 4 will be solely in accord with its output voltage.

As the load current increases to the current limit point, more and more of the current $I_3$ will be made up of current $I_1$, and at the current limit point, the circuit parameters are such that the reverse voltage on diode 33 due to current $I_1$ exceeds the forward voltage. The diode will block, preventing further flow of current $I_2$, and current $I_3$ will be made up solely of current $I_1$. The feedback current will thus be proportional to load current and as load current exceeds the current limit point, the control circuit will rapidly reduce the output voltage of amplistat 4 to prevent the load current from increasing more than a minimum amount above the changeover point.

Up to now, the operation of the feedback circuit has been discussed as though the voltage compounding circuit 54 contributed no regulatory action to the circuit, and insofar as the present invention is concerned, the voltage compounding circuit could be eliminated simply by the elimination of the isolation current transformer 51, the full wave bridge rectifier 53, and the paralleled resistors 38, 39. However, in the form of the invention illustrated, it does have a voltage compounding circuit comprising the aforesaid components and it functions to give the output voltage of power amplistat 4 a characteristic which rises with increase in load current. With either of the resistors 37 or 38 connected in the feedback circuit by closure of its associated switch, a filtered direct current which is proportional to load current will set up a potential across the resistor. This potential will have the same polarity as the normal drop caused by current $I_3$, and the resistor 38 or 39 can be thought of as having a D.-C. voltage source in series therewith; that is the drop across the resistor 38 or 39 which is proportional to load current opposes the output voltage in feedback circuit 29 and has the effect of decreasing the net feedback current flowing through control winding 22 such that the net control current will rise to increase the output voltage of the power amplistat. The voltage compounding circuit will compensate for cable drop in the power leads on the output side of the amplistat 4 and will result in a closely regulated straight-line voltage at the ultimate load supplied by the power amplistat.

Figure 2:
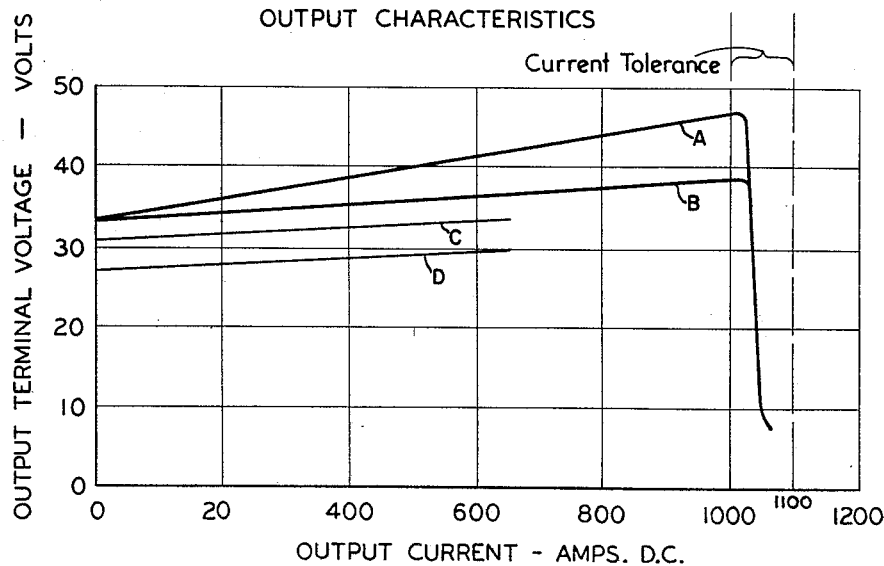
FIG. 2 is a graph illustrating the output characteristics of the power amplistat shown in FIG. 1.

A graphic portrayal of the effect of the aforesaid regulatory action is shown in FIG. 2 where the load current varies between zero and 1,000 amperes at which point the current limiting circuit takes over regulation and rapidly and sharply decreases the output voltage while at the same time allowing the load current to rise to something less than 1,100 amperes. The upper two voltage curves A and B are for one condition of operation with the upper of these two being determined by resistors 34 and 39 and the lower being determined by resistors 35 and 38.

The lower pair of characteristic curves C and D again has its upper characteristic determined by resistors 34 and 39 and its lower characteristic determined by resistors 35 and 38. The upper set of curves corresponds to intermittent demands on the amplistat 4 wherein the load current can reach 1,000 amperes after which further increase is limited to the minimum shown. The lower set of curves in FIG. 2 illustrate steady-state operation of amplistat 4 by which a resistance type load bank maintains a load of 650 amperes on the equipment. For this mode of operation, current limit is unnecessary because the type of load being supplied by the amplistat will not draw currents which exceed the set value. It is interesting to note that the regulation of output voltage where current limit applies is within 1 volt throughout the entire range in current. The diode 33 exhibits about a ½ volt forward drop which is well within the tolerance for voltage regulation so that its effect will only contribute to a rounding of the upper limit of the curves over a range of about 1 percent. This small drop in the rectifier coupled with the extreme stiffness in the current source 24 provides the sharp action at the changeover point.

As said above if a rising output voltage characteristic is not necessary the voltage compounding circuit 54 may be eliminated in which event the characteristic curve will take the form of a horizontal line in FIG. 2 with a sharp turn at the current limit point. In the illustrated embodiment of the invention the rise in current above the point of changeover is something less than 10 percent with precise regulation of output voltage being maintained right up to the point of changeover. With this type of control the equipment need be rated only slightly in excess of 1,000 amperes to thereby achieve a highly efficient and economical design.

It is to be noted that the present invention has equal application in regulated rectifying apparatus where the control circuit is connected directly to the control winding on the main power amplistat. That is to say, the control amplistat may be eliminated, as desired, and the slope of the output characteristic in the current will be the same.

In the control circuit there is also shown a pair of diodes 20 connected in parallel across control winding 13 which function as commutating elements in this winding to reduce the effect of any induced voltages therein.

The resistors 38 and 39 are adjustable to allow adjustment of the cable drop compensation and the resistors 34 and 35 are adjustable to set the open circuit voltage of the amplistat 4. The resistor 27 can be adjusted to vary the current limit point and the resistor 43 connected across diode 33, which functions as a bleeder for rectifier bridge 47, may be adjusted to modify the slope of the output characterstic in the current limit region or constant current area.

From the above then, it is seen that not only is the equipment highly efficient and economical in design but also it has adjustments for all of the compensating and controlling currents to give any desired precise regulation within the limits of the various adjustments.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. In regulated rectifying apparatus which comprises a controllable power rectifier arrangement having input terminals adapted for connection to an alternating current power supply and output terminals adapted for connection to a direct current load, and regulating means for said controllable power rectifier arrangement which includes a control winding in which a regulating current flows, said regulating means functioning to control the magnitude of the voltage across said output terminals in accordance with the magnitude of current flowing in said control winding, control circuit means for regulating the current flowing in said control winding comprising, in combination: means for deriving a first feedback current which is normally proportional to output voltage of said controllable power rectifier arrangement; means for deriving a second feedback current proportional to the output current of said controllable power rectifier arrangement; means for deriving a constant reference current; circuit means including said control winding for adding said first and second feedback currents together and passing their sum through said control winding in a first direction, said sum of said first and second feedback currents being proportional to said output voltage for all values of said output current up to a predetermined value; circuit means for passing said reference current through said control winding in opposition to the sum of said first and second feedback currents whereby the net current in said winding governs the action of said regulating means; and automatically operating means to block said first feedback current when said second feedback current reaches a predetermined value corresponding to a load current which exceeds said predetermined value whereby said second feedback current alone opposes said reference current.

2. In regulated rectifying apparatus which comprises a power amplistat having input terminals adapted for connection to an alternating current power supply and output terminals adapted for connection to a direct current load, and regulating means for said power amplistat which includes a control winding in which a regulating current flows, said regulating means functioning to control the magnitude of the voltage across said output terminals in accordance with the magnitude of current flowing in said control winding, control circuit means for regulating the current flowing in said control winding comprising, in combination: a first feedback circuit which includes said control winding for passing a first feedback current through said winding, said first feedback current being normally proportional to the output voltage of said power amplistat; a constant current source; a reference circuit which includes said control winding and said constant current source for passing a constant reference current through said control winding in opposition to said first feedback current; a second feedback circuit including said control winding for passing a second feedback current through said control winding in additive relation with said first feedback current, said second feedback current being proportional to the load current of said power amplistat and the sum of said first and second feedback currents being proportional to the output voltage of said power amplistat for all values of load current below a predetermined value; and physically stationary means automatically blocking said first feedback circuit when the value of said load current exceeds said predetermined value, said second feedback current then being the only current opposing said reference current whereby said regulating means operates to sharply reduce said output voltage as said load current increases above said predetermined value.

3. In regulated rectifying apparatus which comprises a power amplistat having input terminals adapted for connection to an alternating current power supply and output terminals adapted for connection to a direct current load, and regulating means for said power amplistat which includes a control winding in which a regulating current flows, said regulating means functioning to control the magnitude of the voltage across said output terminals in accordance with the magnitude of current flowing in said control winding, control circuit means for regulating the current flowing in said control winding comprising, in combination: means responsive to the output voltage of said power amplistat for passing a first feedback current through said control winding; means responsive to the output current of said power amplistat for passing a second feedback current proportional to said output current through said control winding; circuit means common to said current and voltage responsive means and including said control winding, said first and second feedback currents combining additively in said circuit means with the value of their sum being proportional to said output voltage for all values of said output current up to a predetermined value; means for passing a constant reference current through said control winding in opposition to said first and second feedback currents whereby the net current in said control winding is said regulating current; and a blocking diode in said circuit means responsive to said second feedback current to prevent passage of said first feedback current when said output current exceeds said predetermined value.

4. In regulated rectifying apparatus which comprises a controllable power rectifier arrangement having input terminals adapted for connection to an alternating current power supply and output terminals adapted for connection to a direct current load, and regulating means for said controllable power rectifier arrangement which includes a control winding in which a regulating current flows, said regulating means functioning to control the magnitude of the voltage across said output terminals in accordance with the magnitude of current flowing in said control winding, control circuit means for regulating the current flowing in said control winding comprising, in combination: a first feedback circuit connected across the output terminals of said controllable power rectifier arrangement and including said control winding; a second feedback circuit connected across said control winding and said first feedback circuit between said control winding and said output terminals, said second feedback circuit including a current source responsive to the output current of said controllable power rectifier arrangement; said first and second feedback circuits deriving first and second feedback currents responsive respectively to output voltage and output current of said controllable power rectifier arrangement, said second feedback current being proportional to said output current, said first and second feedback currents combining additively for all values of said output current up to a predetermined value with their sum being proportional to said output voltage; a reference circuit connected across said control winding operating to pass a constant reference current through said winding in opposition to said first and second feedback currents whereby the net current through said winding is said regulating current; and a blocking diode in said first feedback circuit whose forward voltage is proportional to said output voltage and whose reverse voltage is proportional to said second feedback current, said reverse voltage exceeding said forward voltage to block said diode when said output current exceeds said predetermined value whereby said first feedback current no longer passes through said control winding and regulation of said controllable power rectifier arrangement is solely in accord with the value of its output current.

5. The combination defined by claim 4 wherein said constant reference current always exceeds the opposing feedback current and the regulating means functions to develop maximum output voltage when the net current in said control winding has a maximum value.

6. The combination defined by claim 5 wherein said first feedback current has a maximum value and is proportional to said output voltage when the output terminals of said controllable power rectifier arrangement are open-circuited.

7. The combination defined by claim 6 wherein said first feedback circuit includes an adjustable resistor connected between said control winding and the connections of said second feedback circuit.

8. The combination defined by claim 7 wherein said reference circuit includes an adjustable resistor whereby said reference current can be adjusted.

9. The combination defined by claim 4 wherein said diode is shunted by a variable resistor whereby a variable portion of said second feedback current can be bled from said control winding when said diode is blocked.

References Cited in the file of this patent

UNITED STATES PATENTS

| | | |
|---|---|---|
| 2,673,324 | Burton et al. | Mar. 23, 1954 |
| 2,723,372 | Eagen et al. | Nov. 8, 1955 |
| 2,774,930 | Bixby | Dec. 18, 1956 |
| 2,914,720 | Merkel | Nov. 24, 1959 |